US006867620B2

(12) United States Patent
Singh et al.

(10) Patent No.: US 6,867,620 B2
(45) Date of Patent: *Mar. 15, 2005

(54) CIRCUITS AND METHODS FOR HIGH-CAPACITY ASYNCHRONOUS PIPELINE

(75) Inventors: Montek Singh, Chapel Hill, NC (US); Steven M. Nowick, Leonia, NJ (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/257,896

(22) PCT Filed: Apr. 25, 2001

(86) PCT No.: PCT/US01/13226

§ 371 (c)(1),
(2), (4) Date: Jun. 2, 2003

(87) PCT Pub. No.: WO01/82064

PCT Pub. Date: Nov. 1, 2001

(65) Prior Publication Data

US 2004/0025074 A1 Feb. 5, 2004

Related U.S. Application Data

(60) Provisional application No. 60/199,439, filed on Apr. 25, 2000.

(51) Int. Cl.[7] .............................................. H03K 19/00
(52) U.S. Cl. .......................... 326/121; 326/93; 326/112
(58) Field of Search ............................. 326/93–98, 112, 326/119, 121

(56) References Cited

U.S. PATENT DOCUMENTS

| 69,347 A | 6/1867 | Singh et al. ................. 712/216 |
| 5,329,176 A | * | 7/1994 | Miller, Jr. et al. ............ 326/21 |
| 6,028,453 A | | 2/2000 | Kong ......................... 326/113 |
| 6,320,418 B1 | * | 11/2001 | Fujii et al. .................... 326/93 |
| 6,356,117 B1 | * | 3/2002 | Sutherland et al. ........... 326/93 |
| 6,590,424 B2 | * | 7/2003 | Singh et al. .................. 326/93 |

FOREIGN PATENT DOCUMENTS

| WO | 0182053 | 11/2001 | ............. G06F/5/06 |
| WO | 0195089 | 12/2001 | ............. G06F/5/06 |

OTHER PUBLICATIONS

Appleton S et al: "High Performance Two–Phase Asynchronous Pipelines" IEICE Transactions on Information and Systems, Institute of Electronics Information and Comm. Eng. Tokyo, JP, vol. E80–D, no. 3, Mar. 1, 1997, pp. 287–294, XP000723715 ISSN: 0916–8532 p. 291, right–hand column, paragraph 2 –p. 292, right–hand column, paragrapgh 4.

Tan Y K et al.: "Self–Time Precharge Latch" Proceedings of the International Symposium on Circuits and Systems. New Orleans, May 1–3, 1990, New York, IEEE, US, vol. 1 Conf. 23, May 1, 1990, pp. 566–569, XP00016689 p. 566, right–hand column, paragrapgh 2—p. 567, left–hand column, paragraph 2.

Woods J V et al: "Amulet 1: An Asynchronous Arm Microprocessor" IEEE Transactions on Computers, IEEE Inc. New York, US, vol. 46, no. 4, Apr. 1, 2997, pp. 385–398, XP000656015 ISSN: 0018–9340.

A. Doopley and K. Yun. Optimal clocking and enhanced testability for high–performance self–resetting domino properties. In *ARVLSI'99*.

(List continued on next page.)

*Primary Examiner*—Don Le
(74) *Attorney, Agent, or Firm*—Baker Botts LLP (57) ABSTRACT

A latchless dynamic asynchronous digital pipeline circuit provides decoupled control of pull-up and pull-down. Using two decoupled input, a stage is driven through three distinct phases in sequence: evaluate, isolate and precharge. In the isolate phase, a stage holds its outputs stable irrespective of any changes at its inputs. Adjacent pipeline stages are capable of storing distinct data items without spacers.

20 Claims, 7 Drawing Sheets

OTHER PUBLICATIONS

D. Harris and M. Horowitz. Skew–tolerant domino circuits. *IEEE JSSC*. 32(11):1702–1711, Nov. 1997.

W. Liu, C.T. Gray, D. Fan, W.J. Farlow, T.A. Hughes, and R.K. Cavin. A 250–MHz wave pipeland adder in 2–$\mu$m CMOS. *IEEE JSSC*, 29(9):1117–1128, Sep. 1994.

C. Molnar, I. Jones, W. Coates, J. Lexau, S. Fairbanks, and I. Sutherland. Two FIFO ring performance experiments. Proceedings of the *IEEE*, 87(2):297–307, Feb. 1999.

A. Mukherjee, R. Sudhakar, M. Marke–Sadowska, and S. Long. Wave steering in YADDs: a novel non–iterative syntheses and layout technique. In *PROC. DAC*. 1999.

V. Narayanan, B. Chappell, and B. Fleischer. Static timing analysis for self resetting circuits. In *Proc. ICCAD*, 1996.

M. Renaudin, B. Ilassan, and A. Guyot. New asynchronous pipeline scheme: Application to the design of a self–time ring divider. IEEE JSSC, 31(7):1001–1013, Jul. 1996.

M. Singh and S. Nowick. High–throughput asynchronous pipelines for fine–grain dynamic datapaths. In *Proc. Ind. Symp. Adv. Res. Async. Circ. Syst. (ASYNC)*, 2000.

C. van Berkel. M. Josephs, and S. Nowick. Scanning the technology: Applications of asynchronous circuits. Proceedings of the IEEE, 87(2):223–233, Feb. 1999.

T. Williams. Self–Timed Rings and their Application to Division. PhD thesis, Stanford University, Jun. 1991.

T. Williams and M. Horowitz. A zero–overhead self–timed 160ns 54b CMOS divider. IEEE JSSC,26(11):1651–1661, Nov. 1991.

D. Wong, G. De Micheli, and M. Flynn. Designing high-performance digital circuits using wave–pipeling. IEEE TCAD, 12(1):24–26, Jan. 1993.

K. Yun, P. Beersel, and J. Arceo. High–performance asynchronous pipeline circuits. In *Proc. Intl. Symp. Adv. Res. Async. Circ. Syst. (ASYNC)*, 1996.

International Application Ser. No. PCT/US01/13226, International Search Report, Nov. 14, 2001.

* cited by examiner

CIRCUITS AND METHODS FOR HIGH-CAPACITY ASYNCHRONOUS PIPELINE

CROSS-REFERENCE TO RELATED APPLICATION

This application claims priority to U.S. Provisional Patent Application entitled "Fine-Grain Pipelined Asynchronous Adders for High-Speed DSP Applications," Ser. No. 60/199,439, which was filed on Apr. 25, 2000, and which is incorporated by reference in its entirety herein.

BACKGROUND OF THE INVENTION

1. Field of the Invention

This invention relates circuits and methods for asynchronous pipeline processing, and more particularly to pipelines providing high buffering and high throughput.

2. Background of the Related Art

There has been increasing demand for pipeline designs capable of multi-GigaHertz throughputs. Several novel synchronous pipelines have been developed for these high-speed applications. For example, in wave pipelining, multiple waves of data are propagated between two latches. However, this approach requires significant design effort, from the architectural level down to the layout level, for accurate balancing of path delays (including data-dependent delays), yet such systems remain highly vulnerable to process, temperature and voltage variations. Other aggressive synchronous approaches include clock-delayed domino, skew-tolerant domino, and self-resetting circuits. These approaches require complex timing constraints and lack elasticity. Moreover, high-speed global clock distribution for these circuits remains a major challenge.

Asynchronous design, which replaces global clocking with local handshaking, has the potential to make high speed design more feasible. Asynchronous pipelines avoid the issues related to the distribution of a high-speed clock, e.g., wasteful clock power and management of clock skew. Moreover, the absence of a global clock imparts a natural elasticity to the pipeline since the number of data items in the pipeline is allowed to vary over time. Finally, the inherent flexibility of asynchronous components allows the pipeline to interface with varied environments operating at different rates; thus, asynchronous pipeline styles are useful for the design of system-on-a-chip.

Figure 1:
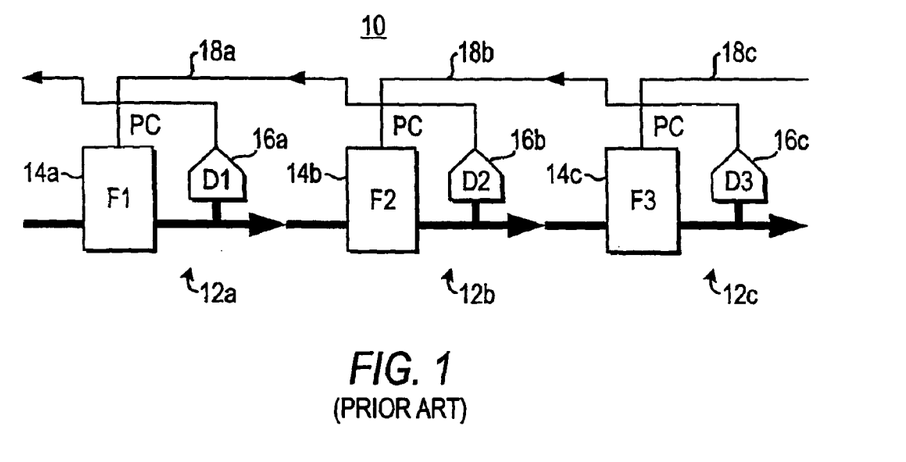
FIG. 1 is an illustration of a prior art pipeline.

One prior art pipeline is Williams' PS0 dual-rail asynchronous pipeline (T. Williams, *Self-Timed Rings and Their Application to Division*, Ph.D. Thesis, Stanford University, June 1991; T. Williams et al., "A Zero-Overhead Self Timed 160ns 54b CMOS Divider, *IEEE JSSC*, 26(11):1651–1661, November 1991). FIG. 1 illustrates Williams' PS0 pipeline 10. Each pipeline stage 12a, 12b, 12c is composed of a dual-rail function block 14a, 14b, 14c and a completion detector 16a, 16b, 16c. The completion detectors indicate validity or absence of data at the outputs of the associated function block.

Figure 2A:
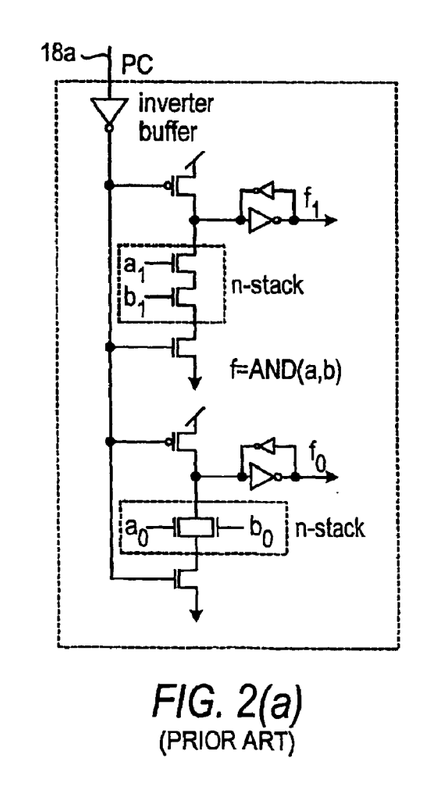
FIG. 2(a) is an illustration of the circuit of a function block of the prior art pipeline of FIG. 1.
Figure 2B:
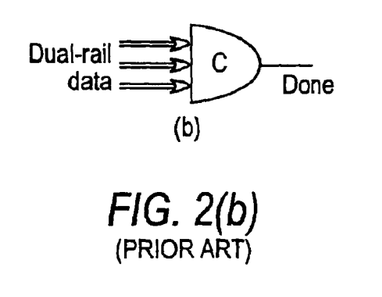
FIG. 2(b) is an illustration of a completion detector of the prior art pipeline of FIG. 1.

Each function block 14a, 14b, 14c is implemented using dynamic logic. A precharge/evaluate control input, PC, of each stage is tied to the output of the next stage's completion detector. For example, the precharge/evaluate control input, PC, of stage 12a is tied to the completion detector 16b of stage 12b and is passed to function block 14a on line 18a. Since a precharge logic block can hold its data outputs even when its inputs are reset, it also provides the functionality of an implicit latch. Therefore, a PS0 stage has no explicit latch. FIG. 2(a) illustrates how a dual-rail AND gate, for example, would be implemented in dynamic logic; the dual-rail pair, $f_1$ and $f_0$, implements the AND of the dual-rail inputs $a_1a_0$ and $b_1b_0$.

The completion detector 16a, 16b, 16c at each stage 12a, 12b, 12c, respectively, signals the completion of every computation and precharge. Validity, or non-validity, of data outputs is checked by OR'ing the two rails for each individual bit, and then using a C-element to combine all the results (See, FIG. 2(a)). A C-element is a basic asynchronous stateholding element. More particularly, the output of an n-input C-element is high when all inputs are high, is low when all inputs are low, and otherwise holds its previous value. It is typically implemented by a CMOS gate with a series stack in both pull-up and pull-down, and an inverter on the output (with weak feedback inverter attached to maintain state).

The sequencing of pipeline control for the Williams' PS0 dual-rail pipeline is as follows: Stage N is precharged when stage N+1 finishes evaluation. Stage N evaluates when stage N+1 finishes reset. Actual evaluation will commence only after valid data inputs have also been received from stage N−1. This protocol ensures that consecutive data tokens are always separated by reset tokens or spacers.

The complete cycle of events for a pipeline stage is derived by observing how a single data token flows through an initially empty pipeline. The sequence of events from one evaluation by stage 12a, to the next is: (i) Stage 12a evaluates, then (ii) stage 12b evaluates, then (iii) stage 12b's completion detector 16b detects completion of evaluation, and then (iv) stage 12a precharges. At the same time, after completing step (ii), (iii)' stage 12c evaluates, then (iv)' stage 12c's completion detector 16c detects completion of evaluation, and initiates the precharge of stage 12b, then (v) stage 12b precharges, and finally, (vi) stage 12b's completion detector 16b detects completion of precharge, thereby releasing the precharge of stage 12a and enabling stage 12a to evaluate once again. Thus, there are six events in the complete cycle for a stage, from one evaluation to the next.

The complete cycle for a pipeline stage, traced above, consists of 3 evaluations, 2 completion detections and 1 precharge. The analytical pipeline cycle time, $T_{PS0}$, therefore is:

$$T_{PS0} = 3 \cdot t_{Eval} + 2 \cdot t_{CD} + t_{Prech} \quad (1)$$

where, $t_{Eval}$ and $t_{Prech}$, are the evaluation and precharge times for each stage, and $t_{CD}$ is the delay through each completion detector.

The per-stage forward latency, L, is defined as the time it takes the first data token, in an initially empty pipeline, to travel from the output of one stage to the output of the next stage. For PS0, the forward latency is simply the evaluation delay of a stage:

$$L_{PS0} = t_{Eva} \quad (2)$$

A disadvantage of this type of latch-free asynchronous dynamic pipelines (e.g., PS0), is that alternating stages usually must contain "spacers," or "reset tokens," limiting the pipeline capacity to 50%. Another disadvantage of the Williams pipeline is that it requires a number of synchronization points between stages. Moreover, William's maintains data integrity by constraining the interaction of pipeline stages, i.e., the precharge and evaluation of a stage are synchronized with specific events in neighboring stages.

Three recent, competitive asynchronous pipelines provide improved performance but suffer from numerous disadvantages which have been removed by the digital signal processing pipeline apparatus in accordance with the invention.

A design by Renaudin provides high storage capacity (M. Renaudin et al. "New Asynchronous Pipeline Scheme: Application to the Design of a Self-Timed Ring Divider, IEEE JSSC, 31(7): 1001–1013, July 1996). Renaudin's pipelines achieve 100% capacity without extra latches or "identity stages." Their approach locally manipulates the internal structure of the dynamic gate in order to provide increased capacity.

However, there are two significant disadvantages of Renaudin's pipelines. First, in Renaudin's pipelines, extra latching is achieved by modifying the output inverter of each dynamic gate into a gated inverter, through the use of additional transistors. A second disadvantage of Renaudin's pipelines is a relatively low throughput. In particular, Renaudin's pipelines are based on a much more conservative form of PS0 pipelines, called PC0. Consequently, their throughput, while an improvement over PC0, is worse than even that of PS0.

The two FIFO designs by Molnar et al.—the asp* FIFO and the micropipelined FIFO—are among the most competitive pipelines presented in literature, with reported throughputs of 1.1 Giga and 1.7 Giga items/second in 0.6 $\mu$m CMOS (C. Molnar et al., "Two FIFO Ring Performance Experiments," Proceedings of the IEEE, 87(2):297–307, February 1999).

Molnar's first FIFO, asp*, has significant drawbacks. When processing logic is added to the pipeline stages, the throughput of the asp* FIFO is expected to significantly degrade relative to the pipeline designs described herein. This performance loss occurs because the asp* FIFO requires explicit latches to separate logic blocks. The latches are essential to the design; they ensure that the protocol will not result in data overruns. As a result, in asp*, with combinational logic distinct from latches, the penalty of logic processing can be significant. In addition, the asp* FIFO has complex timing assumptions which have not been explicitly formalized; in fact, an early version was unstable due to timing issues.

Molnar's second design, the micropipelined FIFO, also has several shortcomings. First, the micropipeline is actually composed of two parallel "half-rate" FIFO's, each providing only half of the total throughput (0.85 Giga items/second); thus, the net throughput of 1.7 Giga items/second is achieved only at a significant cost in area. Second, the micropipelined uses very expensive transition latches. Another limitation of the micropipelined FIFO is that it cannot perform logic processing at all; i.e., it can only be used as a FIFO. The reason for this restriction is that it uses a complex latch structure in which parts of each latch are shared between adjacent stages. As a result, insertion of logic blocks between latches is not possible.

Among the fastest designs reported in literature are the IPCMOS pipelines, with throughputs of 3.3–4.5 GHz in a 0.18 $\mu$m CMOS process (S. Shuster et al., "Asynchronous Interlocked Pipelined CMOS Circuits Operating at 3.3–4.5 GHz, Proceedings ISSCC, February 2000). IPCMOS has disadvantages at the circuit as well as at the protocol levels. First, IPCMOS uses large and complex control circuits which have significant delays. Second, IPCMOS makes use of extremely aggressive circuit techniques, which require a significant effort of design and verification. For example, one of the gates in their "strobe" circuit potentially may have a short circuit through its pull-up and pull-down stacks, depending on the relative arrival times of inputs to the two stacks from multiple data streams. Their approach relies on a ratioing of the stacks to ensure correct output. Third, in IPCMOS, pipeline stages are enabled for evaluation only after the arrival of valid data inputs. Hence, the forward latency of a stage is poor, because of the delay to precharge-release the stage.

It is an object of the invention to provide high throughput and high storage capacity through decoupling the controls of precharge and evaluation. It is another object to reduce the need for a "reset" spacer between adjacent data tokens to increase storage capacity It is an object of the invention to provide an asynchronous pipeline having protocols wherein no explicit latches are required.

It is an object of the invention to provide an asynchronous pipeline having simple one-sided timing constraints, which may be easily satisfied.

It is an object of the invention to provide an asynchronous pipeline having function blocks that may be enabled for evaluation before the arrival of data Thus, data insertion in an empty pipeline can ripple through each stage in succession.

It is a further object to provide an asynchronous pipeline having high data integrity, wherein a stage may hold its outputs stable irrespective of any changes in its inputs.

It is yet another object of the invention to provide an asynchronous pipeline having reduced critical delays, smaller chip area, lower power consumption, and simple, small and fast control circuits to reduce overhead.

It is another object of the invention to provide an asynchronous pipeline capable of merging multiple input data streams.

SUMMARY OF THE INVENTION

These and other objects of the invention are accomplished in accordance with the principles of the invention through an asynchronous digital pipeline circuit which allows a much denser packing of data tokens in the pipeline, thus providing higher storage, or buffering, capacity. Other beneficial features include low forward latency and easily-satisfiable one-sided timing constraints.

An asynchronous digital pipeline circuit, having latchless dynamic logic has a first processing stage configured to be driven through a cycle of phases consisting of a first precharge phase, followed by an first evaluate phase, followed by a first isolate phase. In the first isolate phase, the output of the first processing stage is isolated from changes in the input thereof, but maintains the value of stored data at its outputs. The first processing stage is responsive to a first precharge control signal and a first evaluate control signal in order to pass through the three cycles of operation. A first stage controller is responsive to a transition signal and provides the first and second decoupled control signals to the first processing stage.

A second processing stage is configured to be driven through a cycle of phases consisting of a second precharge phase, followed by a second evaluate phase, followed by a second isolate phase, solely in response to a second precharge control signal and a second evaluate control signal. The second processing stage provides a transition signal indicative of the phase thereof. An interconnection is provided between the first processing stage and the second processing stage such that reception of the transition signal by the first stage controller enables the first processing stage to cycle through the precharge phase, the evaluate phase, and the isolate phase while the second processing stage remains in one of the evaluate phase and the isolate phase. Under these circumstances, the first processing stage and the second processing stage are able to store different data tokens without separation by a spacer.

A single explicit synchronization point is provided between the first processing stage and the second processing stage. When the transition signal indicative of the phase of the second processing stage is asserted, the first processing stage is enabled to begin the cycle of precharge, evaluate, and isolate. This single explicit synchronization point increases the concurrency of operation. When the transition signal indicative of the phase of the second processing stage is de-asserted, however, there is no command to change the phase of the first processing stage.

Further features of the invention, its nature and various advantages will be more apparent from the accompanying drawings and the following detailed description of the preferred embodiments.

BRIEF DESCRIPTION OF THE INVENTION

DETAILED DESCRIPTION OF THE PREFERRED EMBODIMENTS

The asynchronous digital pipeline circuit in accordance with the invention decouples the control of pull-up and pull-down in each processing stage. A dynamic gate is controlled by two separate inputs, pc and eval. Using these inputs, a stage is driven through three distinct phases in sequence: evaluate, isolate and precharge, as will be described in greater detail herein. In the isolate phase, a stage holds its output stable irrespective of any changes at its inputs. As a result, adjacent pipeline stages are capable of storing distinct data items, thus obtaining 100% storage capacity.

Figure 3:
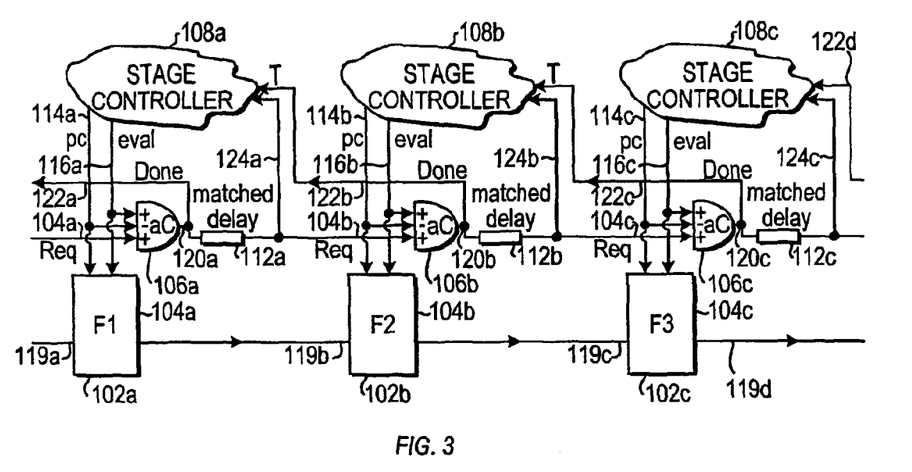
FIG. 3 is a block diagram of an asynchronous digital pipeline circuit in accordance with the invention.

FIG. 3 illustrates a simplified block diagram of a pipeline 100 in accordance with the invention. Three exemplary stages 102a/102b/102c are depicted, although it is contemplated that there may be a greater or fewer number of stages. Each stage 102a/102b/102c may comprise three components: a function block 104a/104b/104c, a completion generator 106a/106b/106c and a stage controller 108a/108b/108c, respectively. Each function block 104a/104b/104c alternately produces data tokens and reset spacers for the next stage, and its completion generator 106a/106b/106c indicates completion of the stage's evaluation or precharge. The third component, the stage controller 108a/108b/108c, generates the pc and eval signals which control the respective function block 104a/104b/104c and the completion generator 106a/106b/106c. These components are discussed in greater detail below.

A commonly-used asynchronous scheme, called bundled data, is used to implement the single-rail asynchronous datapath. More particularly, a control signal, Req, on line 110a/110b/100c indicates arrival of new inputs to a respective stage 102a/102b/102c. For example, the signal Req on line 110b is an input to the completion generator 106b, and an output from completion generator 106a. A high value of Req indicates the arrival of new data, i.e., the previous stage has completed evaluation. On the other hand, a low value of Req indicates the arrival of a spacer, i.e., the previous stage has completed precharge. For correct operation, a simple timing constraint must be satisfied: Req must arrive after the data inputs to the stage are stable and valid. This requirement is met by inserting a "matched delay" element 112a/112b/112c that provides a delay which is greater than or equal to the worst-case delay through the function block 104a/104b/104c. An advantage of this approach is that the datapath itself can be built using standard single-rail (synchronous style) function blocks.

There are several common ways to implement a matched delay, such as matched delay element 112a/112b/112c. One preferred technique is to use an inverter chain, as is known in the art. Alternatively, a chain of transmission gates may be used, wherein the number of gates and their transistor sizing determines the total delay. An alternative technique duplicates the worst-case critical path of the logic block, and uses that as a delay line. Bundled data has been widely used, including in commercial asynchronous Philips 80C51 microcontroller chips.

Figure 4:
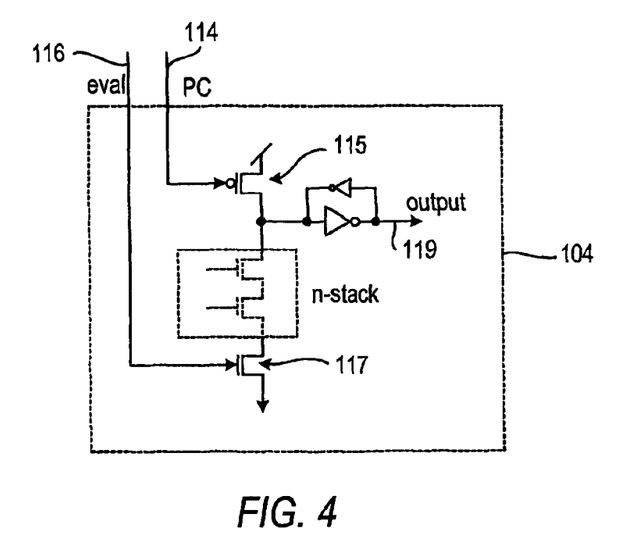
FIG. 4 is schematic diagram of a gate of the block diagram of FIG. 3 in accordance with the invention.

A portion of a function block 104a/104b/104c is illustrated in greater detail in FIG. 4. More particularly, FIG. 4 shows one gate of a function block 104 in a pipeline stage. (When the suffix a, b, or c has been omitted, the features described are common to all components having the same reference number.) The pc input on line 114 controls the pull-up stack 115 (i.e., the precharge) and the eval input on line 116 controls the "foot" of the pull-down stack 117. Precharge occurs when pc is asserted low and eval is de-asserted low. Evaluation occurs when eval is asserted high and pc is de-asserted high. When both signals are de-asserted, the gate output is effectively isolated from the gate inputs; thus, it enters the "isolate phase." To avoid a short circuit, pc and eval are never simultaneously asserted.

With continued reference to FIG. 3, the completion generator 106, is an asymmetric C-element, aC. An asymmetric C-element typically has three types of inputs: those that are marked "+", those marked "−", and a third type that is unmarked. The output of the aC is set high when all the unmarked inputs and all the "+" inputs go high. Conversely, the aC output is reset low when all the unmarked inputs and all the "−" inputs go low. For all other combinations, the aC holds its output value. Completion generator 106 has a positive input eval 116 and a negative input pc 114 from the stage controller 108, and a positive input Req from the output of the previous stage.

In the pipeline 100 in accordance with the invention, the output of the completion generator 106, Done is placed on line 120. The output Done set high when the stage 102 has begun to evaluate, i.e., when two conditions occur: (1) the stage 102 has entered its evaluate phase, i.e., eval is high, and (2) and the previous stage has supplied valid data input, i.e., completion signal Req of previous stage is high. Done is reset simply when the stage is enabled to precharge, i.e., pc asserted low. Thus, a stage's precharge will immediately reset Done, while evaluate will only set Done if the stage is in evaluation and valid data inputs have also arrived.

The output of the completion generator 106 on line 120 is fed through the matched delay element 112, which (when combined with the completion generator) matches the worst-case path through the function block 104. Typically for extremely fine-grain or "gate-level" pipelines, the matched delay may be unnecessary, because the aC delay itself produced by the completion generator 106 often already matches the delay of the function block 104, so no additional matched delay is required.

Finally, the completion signal Done on line 120 is divided three ways and fed to three components: (i) the previous stage's controller 108 on line 122, indicating the current stage's state, e.g., on line 122*b* to stage controller 108*a*; (ii) the current stage's stage controller 108, e.g., on line 124*b* to stage controller 108*b* (through the matched delay element 112*b*); and (iii) the next stage's completion generator 106, e.g., on line 110*c* to completion generator 106*c* (through the matched delay element 112*b*).

With continued reference to FIG. 3, the stage controller 108 produces control signals pc and eval for the function block 104 and the completion generator 106. The stage controller 108 itself receives two inputs: (1) the delayed Done signal of the current stage on line 124 (i.e. Req), henceforth referred to as signal S, e.g., signal S may arrive at stage controller 108*b* on line 124*b*, and (2) the Done signal of the next stage, henceforth referred to as signal T, e.g., signal T arrives at stage controller 108*b* on line 122*c*. The stage controller 108 produces the two decoupled control signals, pc and eval. Details of the stage controller's protocol and implementation will be described in greater detail herein.

Figure 5:
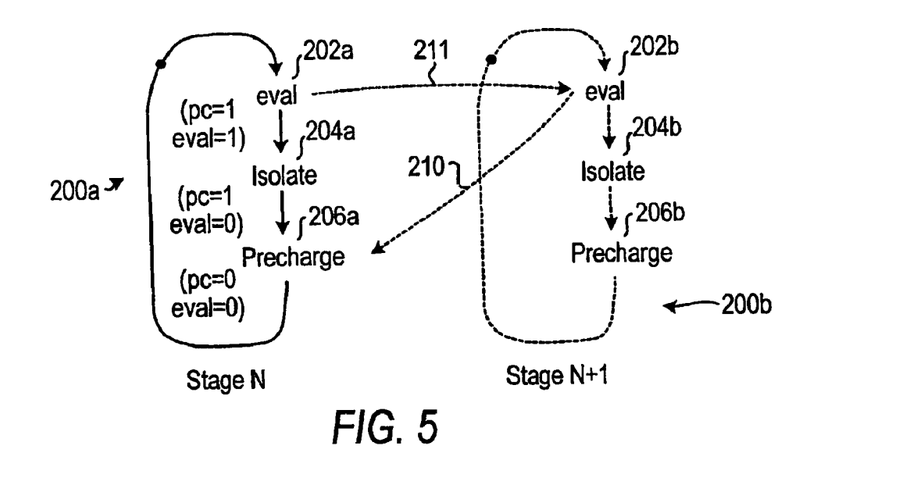
FIG. 5 illustrates a sequence of phases of and interaction of the stages of the asynchronous digital pipeline circuit in accordance with the invention.

Each stage 102 in pipeline 100 cycles through three phases, as illustrated in FIG. 5. Cycle 200*a* is illustrated for a first Stage N, and cycle 200*b* is illustrated for adjacent stage N+1. After Stage N completes its evaluate phase 202*a*, it then enters its isolate phase 204*a* and typically does not proceed to the precharge phase 206*a* until it receives a signal from stage N+1, as will be described below. As soon as the precharge phase 206*a* is complete, it re-enters the evaluate phase 202*a* again, completing the cycle. (Stage N+1 likewise passes through evaluate 202*b*, isolate 204*b*, and precharge 206*b* phases as indicated in dotted line.)

There is one explicit synchronization point, or interconnection, between stages N and N+1. As illustrated by dotted line 210, once a stage N+1 has completed its evaluate phase 202*b*, it enables the previous stage N to perform its entire next cycle: i.e., precharge phase 206*a*, evaluation phase 202*a*, and isolate phase 204*a* for the new data item. There is also one implicit synchronization point as illustrated by dotted line 211: the dependence of stage's N+1's evaluation phase 202*b* on its predecessor stage N's evaluation phase 202*a*. A stage cannot produce new data until it has received valid inputs from its predecessor. Both of the synchronization points are shown by the causality arcs in FIG. 5.

Once a stage finishes evaluation, it isolates itself from its inputs by a self-resetting operation. The stage enters the isolate phase regardless of whether this stage is allowed to enter its precharge phase. As a result, the previous stage can not only precharge, but even safely evaluate the next data token, since the current stage will remain isolated. For example, when stage N+1 completes it evaluate phase 202*a*, it enters the isolate phase 204*a* while stage N may precharge 206*a* and evaluate 202*a* without affecting the output of stage N+1.

There are two benefits of this protocol: (a) higher throughput, since a stage N can evaluate the next data item even before stage N+1 has begun to precharge; and (b) higher capacity for the same reason, since adjacent pipeline stages are now capable of simultaneously holding distinct data tokens, without requiring separation by spacers.

Figure 6A:
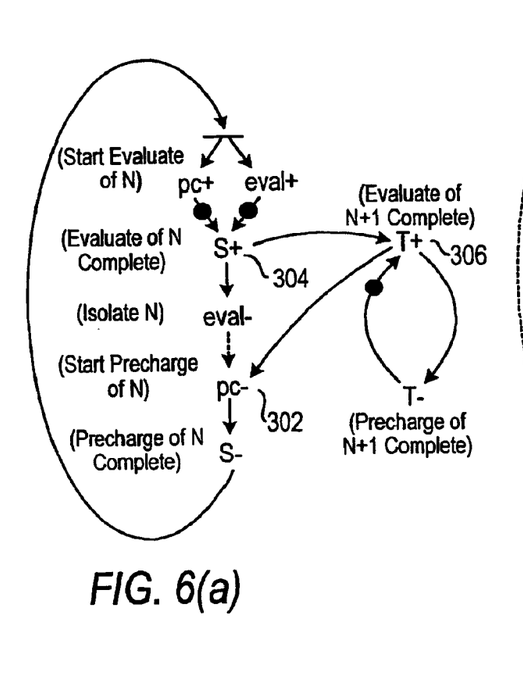
FIG. 6(a) illustrates an exemplary Petri-net specification of an exemplary pipeline stage controller.

A formal specification of the stage controller is given in FIG. 6(*a*) in the form of a Petri-net (a well-known graphical representation commonly used to describe concurrent behaviors). It consists of transitions, indicated by labeled events, and places, which store tokens which are indicated by black dots. A transition fires when all of its incoming arcs have tokens, which are then deposited on all of its outgoing arcs. (Further details concerning Petri-nets are discussed in Tadao Murata, "Petri Nets: Properties, Analysis and Applications," *Proceedings of the IEEE*, 77(4), April 1989; L. Y. Rosenblum and A. V. Yakolev, "Signal Graphs: From Self-Timed to Timed Ones," *Proceedings of International Workshop on Timed Petri Nets*, Torino, Italy, pp. 199–207, July 1985; and Tam-Anh Chu, "On the Models for Designing VLSI Asynchronous Digital Circuits," *Integration, the YLSI Journal*, 4(2):99–113, June 1986, which are incorporated by reference in their entirety herein.)

A Petri-net specification for the stage controller 108 can be deduced from the sequence of phases in a stage cycle, as illustrated with respect to FIG. 5, above. The controller of stage N has two inputs, S and T. which are the Done outputs of stage N and stage N+1 respectively (see FIG. 3), and it has two outputs, pc and eval, which drive stage N.

FIG. 6(*a*) illustrates a Petri-net for a preliminary design of a stage controller. The specification shown in FIG. 6(*a*) presents several shortcomings, as detailed herein. The enabling condition for the precharge of stage N at 302 is ambiguous: stage N has completed evaluation of a data item and is entering the isolate phase at 304 (signal S 124 is high), and stage N+1 has evaluated the same data item at 306 (signal T 122 is high). A problem arises if stage N+1 is blocked or slow, it may continue to maintain its high T 122 output, while stage N processes an entire new data input (precharge then evaluate). In this case, the signals S 124 and T 122 again are both high, but now stage N and stage N+1 have distinct tokens. In this case, since stage N+1 has not absorbed the new data, stage N must not be precharged.

Figure 6B:
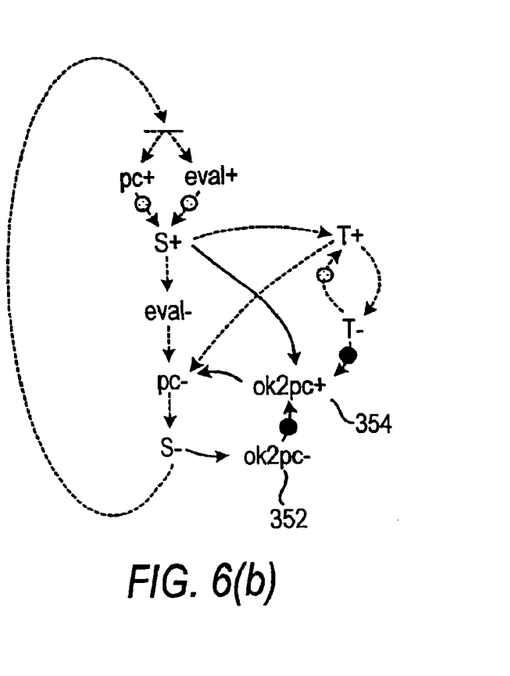
FIG. 6(b) illustrates a Petri-net specification of the pipeline stage controller in accordance with the invention.

A solution to this problem is obtained by adding a state variable, ok2pc 117, implemented by an asymmetric-C element in the stage controller (see FIG. 6(*b*)). The specification in FIG. 6(*b*) is substantially identical to the specification in FIG. 6(*b*), with the differences noted herein. The variable effectively ok2pc 153 records whether stage N+1 has absorbed a data item. As illustrated by Petri-net 350, ok2pc 153 is reset immediately after stage N precharges at 352 (signal S 124 is low), and is only set again once N+1 has undergone a subsequent precharge at 354 (signal T 122 is low).

Figure 7A:
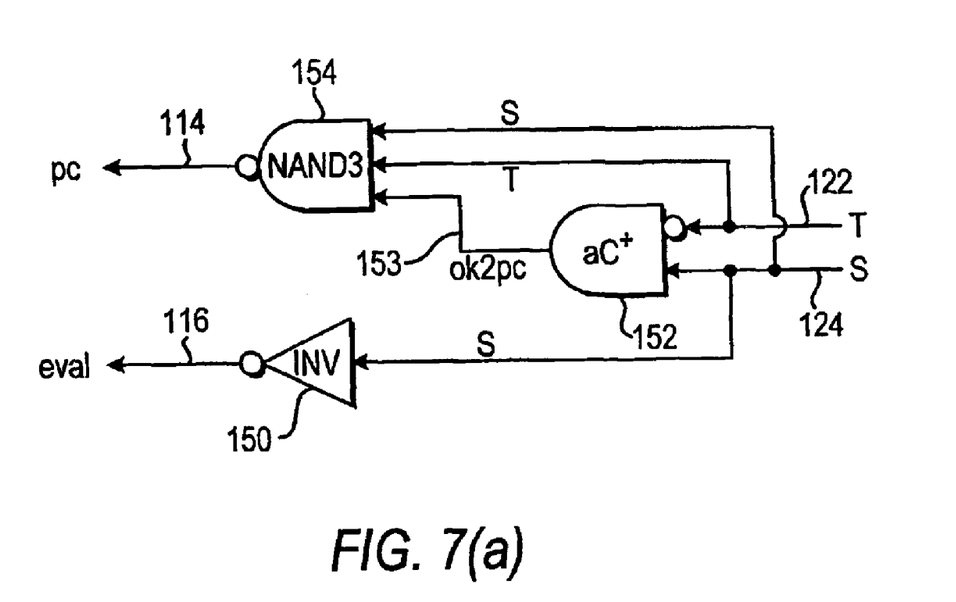
FIG. 7(a) is a logic diagram of a stage controller of the asynchronous digital pipeline circuit illustrated in FIG. 3 in accordance with the invention.
Figure 7B:
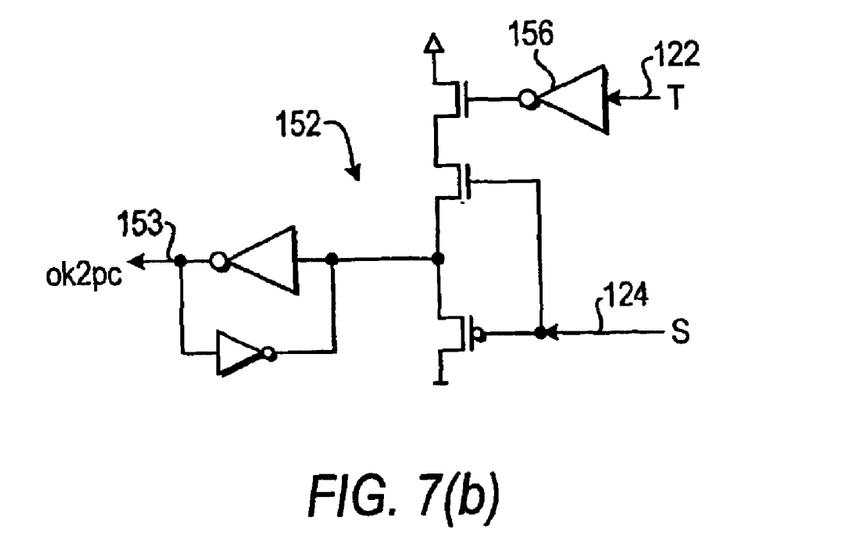
FIG. 7(b) is a circuit diagram of a portion of the stage controller illustrated in FIG. 7(a) in accordance with the invention.

FIGS. 7(a) and 7(b) show an implementation of the controller of FIG. 6(b). The implementation incorporates two input signals, T 122 and S 124, and produces three output signals—pc 114, eval 116, and ok2pc 153—each of which is implemented using a single gate. The controllers directly implement the conditions described above and in the previous subsection.

More particularly, signal eval 116 is the output of an inverter 150 on the S signal 124. With reference to FIG. 7(a) in connection with FIGS. 3 and 5, a stage 104 cycles from the evaluate phase 202 to the isolate phase 204 when eval 116 is de-asserted low without any further inputs. In the embodiment, after stage 104 evaluates, the signal eval 116 is passed through the completion detector on line 120a, and through the matched delay element 112. The output of match delay element 112 is S signal on line 124. After passing through the inverter 150 of stage controller 108, eval signal 116 is de-asserted low, which allows the stage to enter the isolate phase 204.

The generation of the ok2pc signal 153 is performed by the asymmetric C element 152, illustrated in greater detail in FIG. 7(b). An inverter 156 is added to receive the T signal 122, since ok2pc 153 is set high after stage N+1 has completed evaluation and T 122 is low. Although the generation of ok2pc appears to add an extra gate delay to the control path to pc 114, the protocol of FIG. 6 performs this calculation off of the critical path, i.e., ok2pc is set in "background mode," so that ok2pc is typically set before T 122 gets asserted. As a result, the critical path to pc 114 is only one gate delay: from input T 122 through the 3-input NAND3 gate 154, to the output pc 114.

Figure 8:
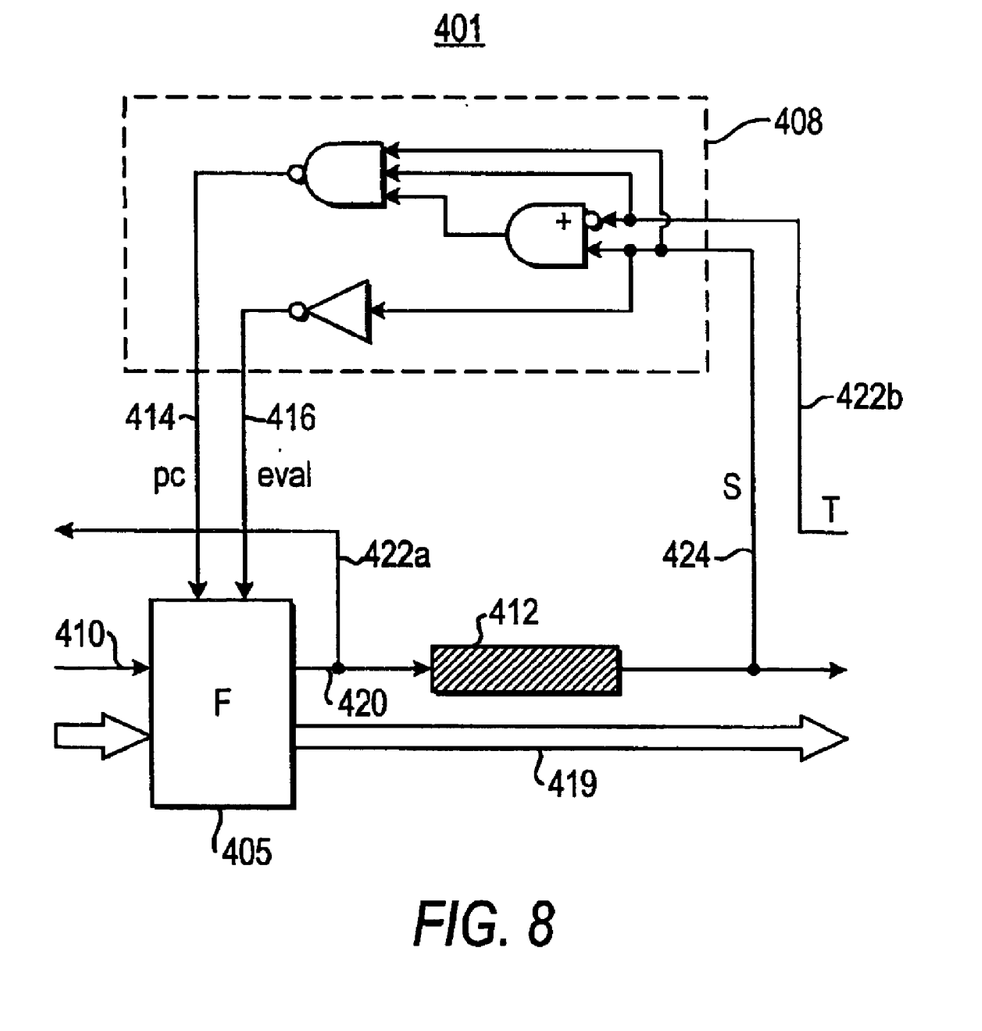
FIG. 8 is a block diagram of an alternative embodiment of a pipeline stage of an asynchronous digital pipeline circuit in accordance with the invention.

FIG. 8 illustrates one complete pipeline stage 401, according to another embodiment in accordance with the invention. More particularly, completion generator 106 and function block 104 of the pipeline stage 102 illustrated in FIG. 3 have been incorporated into a combined function block 405 The stage 401 also includes matched delay element 412 and stage controller 408 (indicated by the dashed line). The output 419 of function block 405 is passed to the next stage (not shown in FIG. 8). The output 420 of the completion generator (not shown) is divided into two signals, one part is passed to matched delay element 412 and the other part becomes signal 422a, which is passed to a previous stage or to the environment. The output of the matched delay element 412 is S signal 424. The inputs to the stage controller 408, as described above with respect to stage controller 108, are the S signal 424 and the T signal 422b from the next stage (not shown in FIG. 8).

A complete cycle of events for stage N can be traced with reference to FIGS. 3 and 5. From one evaluation by stage N to the next evaluation, the cycle consists of three operations: step (i) stage N evaluates, step (ii) stage N+1 evaluates, which in turn enables stage N's controller to assert the precharge input (pc=low) of N, step (iii) stage N precharges, the completion of which, passing through stage N's controller, enables N to evaluate once again (eval asserted high). With reference to the reference numbers in FIGS. 3 and 5, the process proceeds as follows: step (i) stage 102a evaluates 202a and advances to the isolate stage 204a and waits. Subsequently, at step (ii), stage 102b evaluates 202b, and upon completion of stage 102b's evaluation, stage controller 108a receives T signal 112b and asserts pc 114a. At step (iii) Stage 102a precharges 206a, and is enabled to evaluate again.

As described above, no extra matched delays may be required for the gate-level pipeline, because the completion detector and other delays already match the gate's evaluate and precharge. Then, in the notation introduced earlier, the delay of step (i) is $t_{Eval}$, the delay of step (ii) is $t_{aC}+t_{NAND3}$, and the delay of step (iii) is $t_{Prech}+t_{INV}$. Here, $t_{NAND3}$ and $t_{INV}$ are the delays through the NAND3 154 and the inverter 150, respectively, of FIG. 7(a). Thus, the analytical pipeline cycle time is:

$$T_{HC}=t_{Eval}+t_{Prech}+t_{aC}+t_{NAND3}+t_{INV} \quad (3)$$

A stage's latency is simply the evaluation delay of the stage:

$$L_{HC}=t_{Eval} \quad (4)$$

The pipeline 100 according to the invention requires a one-sided timing constraint for correct operation. The ok2pc signal 153 goes high once the current stage has evaluated, and the next stage has precharged (S=1, T=0). Subsequently, signal T goes high as a result of evaluation by the next stage. For correct operation, ok2pc signal must complete its rising transition before T signal goes high:

$$t_{ok2pc\uparrow} < t_{Eval}+t_{INV} \quad (5)$$

In practice, this constraint was very easily satisfied.

An adequate precharge width must be enforced. In this design, the constraint is partly enforced by the bundling constraint: the aC element and the (optional) matched delay, together, must have greater delay than the worst-case precharge time of the function block. Hence, the S signal to the NAND3 154 in FIG. 7(a) will be maintained appropriately.

There is an additional constraint on precharge width: the T signal to the NAND3 154 must not be de-asserted. For example, in the case where the T signal were asserted high, stage 102a's NAND3 154a starts the precharge of 102a (in FIG. 3). Concurrently, T signal 122b will only be reset after a path through the asymmetric C-element (aC) of stage 102c's completion generator 106c, through the NAND3 154b of stage controller 108b and through the asymmetric C-element (aC) of completion generator 106b of stage 102b, and finally through the NAND3 154a of stage controller 108a:

$$t_{NAND3}+t_{Prech_N} \leq t_{aC}+t_{NAND3}+t_{aC}+t_{NAND3} \quad (6)$$

Assuming all stages are similar, this constraint becomes:

$$t_{Prech_N} \leq t_{aC}+t_{aC}+t_{NAND3} \quad (7)$$

This timing constraint is also easily satisfied.

The inverter 150 in FIG. 7(a) is used to enable the isolation of a stage after it evaluates. The bundling constraint already ensures that the isolate phase does not start too early.

EXAMPLE

As a case study, a gate-level pipelined adder was simulated using pipeline described herein. The example shows how multiple input streams for a pipeline stage can be merged together into a single output stream.

A 32-bit ripple-carry adder was selected, since its design is simple and amenable to very fine-grain pipelining. The adder configuration is suitable for high-throughput applications such as DSP's for multimedia processing.

Figure 9:
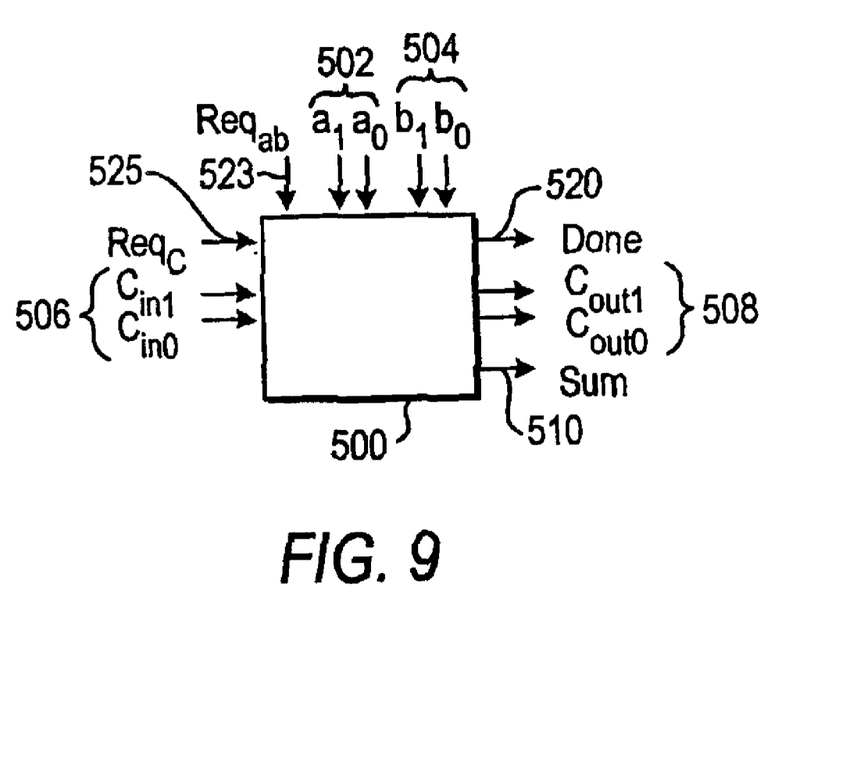
FIG. 9 is a simplified block diagram of an exemplary embodiment in accordance with the invention.

FIG. 9 illustrate an exemplary stage 500 of a ripple-carry adder. Each stage of the adder is a full-adder, which has three data inputs—A 502, B 504, carry-in $C_{in}$ 506—and two outputs—carry-out $C_{out}$ 508 and Sum 510). The logic equations are:

$$\text{Sum} = A \oplus B \oplus C_{in}, \text{ and} \quad (8)$$

$$C_{out} = AB + AC_{in} + BC_{in}. \quad (9)$$

A mixture of dual-rail and single-rail encodings are used to represent the adder datapath. Since the exclusive-or operation needs both true and complemented values of its operands, two rails are used to represent each of the data inputs, A, B and $C_{in}$ as required for dynamic logic implementation. Further, since $C_{out}$ of a stage is the $C_{in}$ of the next stage, it is also represented using two rails. Sum, on the other hand, is represented using only a single rail, since its complemented value is not needed. The entire datapath is a bundled datapath, and therefore, may be regarded as single-rail, even though some of the signals are represented using two rails.

Denoting A 502, B 504, $C_{in}$ 506 and $C_{out}$ 508 by $a_1 a_0$, $b_1 b_0$, $c_{in_1} c_{in_0}$ and $c_{out_1} c_{out_0}$ respectively, the adder equations are written as:

$$\text{Sum} = (a_1 b_0 + a_0 b_1) c_{in_0} + (a_1 b_1 + a_0 b_0) c_{in_1}, \quad (10)$$

$$C_{out_1} = a_1 b_1 + (a_1 + b_1) c_{in_1}, \text{ and} \quad (11)$$

$$C_{out_0} = a_0 b_0 + (a_0 + b_0) c_{in_0}. \quad (12)$$

In the embodiment, each of the three outputs, Sum, $c_{out_1}$ and $c_{out_0}$, was implemented using a single dynamic gate. Thus, each stage has only one level of logic.

Unlike the pipeline structures described herein, the pipelined adder is a non-linear structure. A stage 500 may merge three distinct input streams, i.e., the two data operands and the carry-in. Therefore, alternative embodiments of the pipeline structures are described herein to handle multiple sources. In particular, since each full-adder stage represents a synchronization point of multiple input streams, it must have the capability to handle multiple bundled inputs (i.e., "request" signals).

The inputs A 502 and B 504 may be taken as belonging to one shared data stream with a common bundling signal $\text{req}_{ab}$ 523. The $C_{in}$ input along with carry-in $\text{req}_c$ 525 forms the other stream. Thus, only two input streams are assumed: data operands and carry-in. In practice, this is a reasonable assumption in many applications where operands come from the same source. If this assumption does not hold, our approach can be extended to handle three independent threads.

Figure 10:
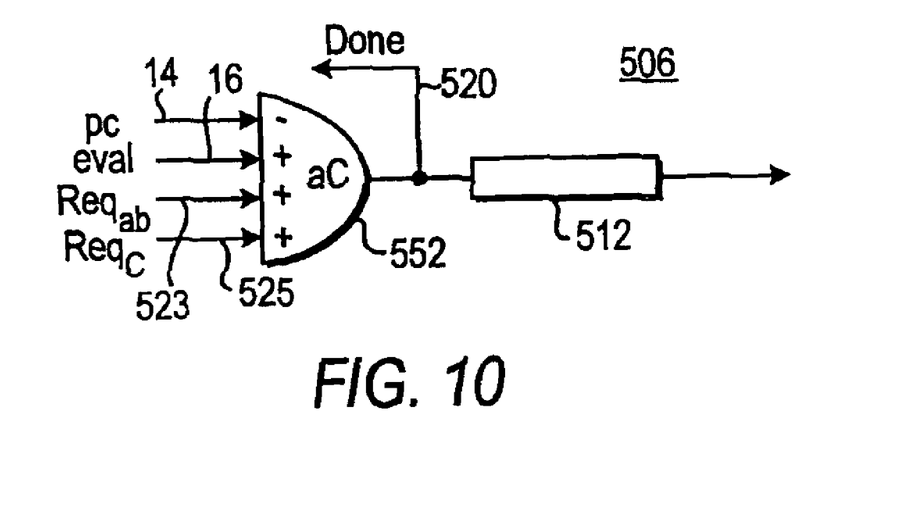
FIG. 10 is a block diagram of a portion of the embodiment of FIG. 9 in accordance with the invention.

FIG. 10 illustrates another embodiment of the completion generator 506. The completion generator 506 synchronize on both the data inputs $\text{req}_{ab}$ 523 and the carry-in input $\text{req}_c$ 525. Each additional request signal is accommodated by adding one transistor to the pull-down stack of the asymmetric C-element 552 of the completion generator. The resulting Done output signal 520 is forked to three destinations, i.e., as "acknowledgements" to the stage that sent the carry-in, to the stage that sent the operands, and also as a "request" to the next stage.

Figure 11:
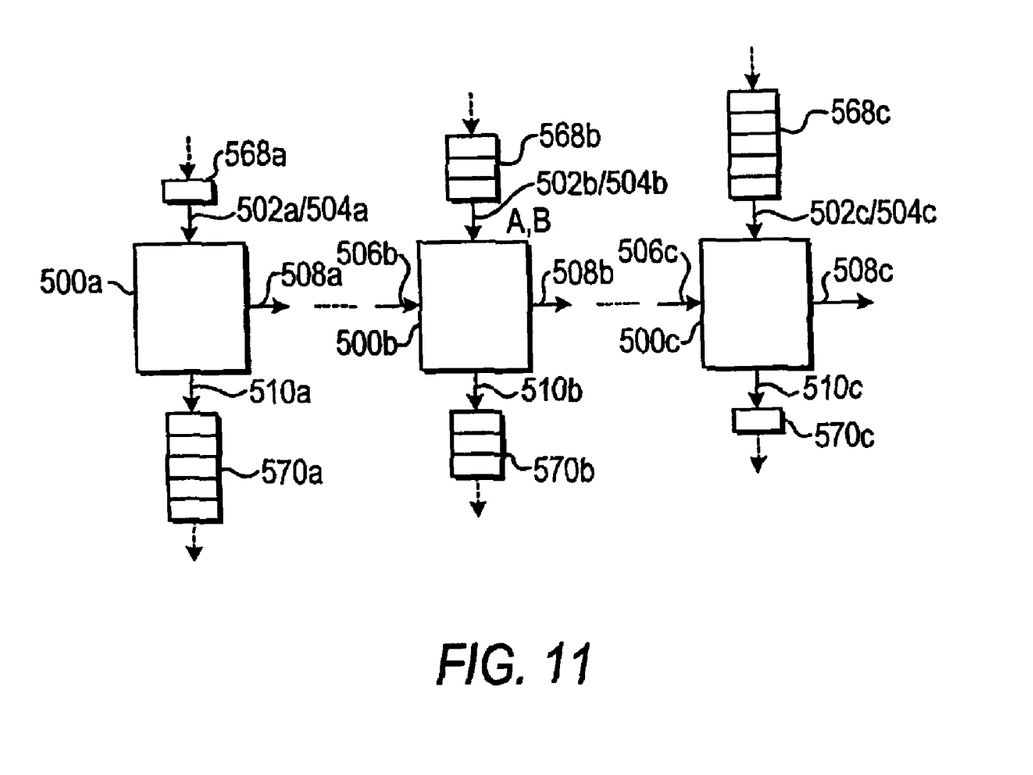
FIG. 11 is a simplified block diagram of another embodiment in accordance with the invention.

Finally, the entire adder architecture is shown in FIG. 11. Shift registers 568a, 568b, and 568c provide operand bits to each of adder stages 500a, 500b, and 500c respectively. A shift-register 570a, 570b, 570c is attached to each respective adder stage 500a, 500b, 500c is to accumulate the stream of sum bits coming out of that stage. Once all the sum bits for an addition operation are available, they can be read off in parallel, one bit from each shift-register. The shift registers can themselves be built as asynchronous pipelines according to the embodiments described herein.

The 32-bit ripple carry adders were simulated in HSPICE using a 0.6 $\mu$m HP CMOS process with operating conditions of 3.3V power supply and 300° K. Special care was taken to optimize the transistor sizing for high-throughput. The precharge PMOS transistors in each dynamic gate had a W/L ration of 18$\lambda$/2$\lambda$. The NMOS transistors in the evaluation stack were so sized that the effective width of the n-stack was ⅓ that of the p-stack. Furthermore, for each of the designs, it was ensured that the timing constraints of were comfortably met.

Table 1 summarizes the simulation results.

TABLE 1

| $t_{Eval}$ (ns) | $t_{Prech}$ (ns) | $t_{aC}$ (ns) | $t_{NAND3}$ (ns) | $t_{INV}$ (ns) | Cycle Time Analytical Formula | (ns) | Throughput $10^6$ items/sec |
|---|---|---|---|---|---|---|---|
| 0.26 | 0.23 | 0.26 | 0.12 | 0.11 | $t_{Eval} + t_{Prech} + t_{aC} + t_{NAND3} + t_{INV}$ | 0.98 | 1023 |

Table 1 lists the overall cycle time as well as its breakdown into components: stage evaluation time ($t_{Eval}$), stage precharge time ($t_{Prech}$), the delay though the completion block ($t_{aC}$), as well as the delays through the control gates ($t_{NAND3}$ and $t_{INV}$). Finally, the table lists the throughput of each adder in million operations per second. The throughputs of the adders was found to be 1023 million operations per second.

It will be understood that the foregoing is only illustrative of the principles of the invention, and that various modifications can be made by those skilled in the art without departing from the scope and spirit of the invention.

What is claimed is:

1. A latchless dynamic asynchronous digital pipeline circuit comprising:

a first processing stage configured to be driven through a cycle of phases consisting of a first precharge phase, followed by an first evaluate phase, and followed by a first isolate phase, solely in response to a first precharge control signal and a first evaluate control signal, wherein the output of the first processing stage is isolated from changes in the input thereof when in the first isolate phase and wherein the first precharge control signal is decoupled from the first evaluate control signal;

a first stage controller responsive to a transition signal indicative of a phase of a second processing stage and configured to provide the first precharge control signal and first evaluate control signal to the first processing stage;

a second processing stage configured to be driven through a cycle of phases consisting of a second precharge phase, followed by a second evaluate phase, and followed by a second isolate phase, solely in response to a second precharge control signal and a second evaluate control signal;

a completion generator which is configured to provide the transition signal indicative of the phase of the second processing stage which is asserted upon completion of the second evaluate stage, wherein one interconnection is provided between the first processing stage and the second processing stage such that reception by the first stage controller of the transition signal indicative of the stage of the second processing stage enables the first processing stage to cycle through the precharge phase, the evaluate phase, and the isolate phase when the transition signal indicative of the phase of the second processing stage is asserted.

2. The latchless dynamic asynchronous digital pipeline circuit as recited in claim 1, further comprising:

a first completion generator configured to provide a first transition signal indicative of the phase of the first processing stage to the first stage controller.

3. The latchless dynamic asynchronous digital pipeline circuit as recited in claim 2, wherein the first processing stage enters the first evaluate phase when the first stage controller asserts the first evaluate control signal and de-asserts the first precharge control signal.

4. The latchless dynamic asynchronous digital pipeline circuit as recited in claim 2, wherein the first processing stage enters the first isolate phase when the first stage controller de-asserts the first evaluate control signal and de-asserts the first precharge control signal.

5. The latchless dynamic asynchronous digital pipeline circuit as recited in claim 2, wherein the first processing stage enters the first precharge phase when the first stage controller de-asserts the first evaluate control signal and the first precharge control signal is asserted.

6. The latchless dynamic asynchronous digital pipeline circuit as recited in claim 2, wherein the first transition signal is asserted when the first processing stage has entered the evaluate phase and a previous stage has provided valid inputs to the first processing stage.

7. The latchless dynamic asynchronous digital pipeline circuit as recited in claim 2, wherein the first transition signal is de-asserted when the first processing stage has entered the precharge stage.

8. A latchless dynamic asynchronous digital pipeline circuit comprising:

a first processing stage configured to be driven through a cycle of phases consisting of a first precharge phase, followed by an first evaluate phase, and followed by a first isolate phase, solely in response to a first precharge control signal and a first evaluate control signal;

a first stage controller responsive to a transition signal and providing the first precharge control signal and the first evaluate control signal to the first processing stage, wherein the first precharge control signal is decoupled from the first evaluate control signal; and a second processing stage configured to be driven through a cycle of phases consisting of a second precharge phase, followed by a second evaluate phase, and followed by a second isolate phase, solely in response to a second precharge control signal and a second evaluate control signal, wherein the output of the second processing stage is isolated from changes in the input thereof when in the second isolate phase, and wherein the second processing stage provides a transition signal indicative of the phase thereof to the first stage controller, wherein an interconnection is provided between the first processing stage and the second processing stage such that reception of the transition signal by the first stage controller enables the first processing stage to cycle through the first precharge phase, the first evaluate phase, and the first isolate phase while the second processing stage remains in the second isolate phase, such that first processing phase and the second processing phase may store two separate tokens without separation by a precharge phase.

9. The latchless dynamic asynchronous digital pipeline circuit as recited in claim 8, further comprising:

a first completion generator configured to provide a first transition signal indicative of the phase of the first processing stage to the first stage controller.

10. The latchless dynamic asynchronous digital pipeline circuit as recited in claim 9, wherein the first processing stage enters the first evaluate phase when the first stage controller asserts the first evaluate control signal and de-asserts the first precharge control signal.

11. The latchless dynamic asynchronous digital pipeline circuit as recited in claim 9, wherein the first processing stage enters the first isolate phase when the first stage controller de-asserts the first evaluate control signal and de-asserts the first precharge control signal.

12. The latchless dynamic asynchronous digital pipeline circuit as recited in claim 9, wherein the first processing stage enters the precharge phase when the first stage controller de-asserts the first evaluate control signal and the first precharge control signal is asserted.

13. The latchless dynamic asynchronous digital pipeline circuit as recited in claim 9, wherein the first transition signal is asserted when the first processing stage has entered the evaluate phase and a previous stage has provided valid inputs to the fits processing stage.

14. The latchless dynamic asynchronous digital pipeline circuit as recited in claim 9, wherein the first transition signal is de-asserted when the first processing stage has entered the precharge stage.

15. A processing stage in an latchless dynamic asynchronous digital circuit, having latchless dynamic logic comprising:

a stage controller configured to provide a precharge control signal and an evaluate control signal, wherein the precharge control signal is decoupled from the evaluate control signal; and a first processing stage having an input and an output and configured to be driven through a cycle of phases consisting of a precharge phase, followed by an evaluate phase, followed by an isolate phase, and returning to the precharge phase solely in response to the precharge control signal and the evaluate control signal from the stage controller, wherein the output is isolated from changes in the input thereof when in the isolate phase.

16. The processing stage in a latchless dynamic asynchronous digital pipeline circuit as recited in claim 15, wherein the first processing stage enters the first evaluate phase when the first evaluate control signal is asserted and the first precharge control signal is de-asserted.

17. The processing stage in a latchless dynamic asynchronous digital pipeline circuit as recited in claim 15, wherein the first processing stage enters the first isolate phase when the first evaluate control signal is de-asserted and the first precharge control signal is de-asserted.

18. The processing stage in a latchless dynamic asynchronous digital pipeline circuit as recited in claim 15, wherein the first processing stage enters the first precharge phase when the first evaluate control signal is de-asserted and the first precharge control signal is asserted.

19. A latchless dynamic asynchronous digital pipeline circuit comprising:

a first processing stage comprising a first function block comprising a pull-up stack controlled by a first precharge control signal, a pull-down stack controlled by a first evaluate control signal, a first data input and a first data output, configured to be driven through a cycle of phases consisting of a first precharge phase, followed by an first evaluate phase, and followed by a first isolate phase, solely in response to a first precharge control signal and a first evaluate control signal, wherein the first data output is isolated from a change in the first data input when the first precharge control signal and the second precharge control signal are de-asserted in the first isolate phase;

a first completion generator comprising an asymmetric C-element configured to receive the first precharge control signal, the first evaluate control signal, and a valid data input signal as inputs, wherein the asymmetric C-element produces a first transition signal which is asserted when both the first evaluate control signal and the valid data input are asserted, and which is de-asserted when the first precharge control signal is asserted;

a first matched delay element comprising a plurality of inverters configured to receive the first transition signal as an input and to produce a first delayed transition signal as an output;

a first stage controller comprising an inverter configured to receive the first delayed transition signal from the first matched delay element as an input and to produce the first evaluate control signal as an output, an asymmetric C-element configured to receive the first delayed transition signal and a second transition signal from a second processing stage as inputs and to produce an intermediate control signal which is de-asserted when the first delayed transition signal is de-asserted and which is asserted when the first transition signal is asserted and the second transition signal is asserted, and a NAND-gate configured to receive the first delayed transition signal, the second transition signal and the intermediate control signal as inputs, and to produce the first precharge signal as an output; and a second processing stage comprising a second function block comprising a pull-up stack controlled by a second precharge control signal, a pull-down stack controlled by a second evaluate control signal, a second data input and a second data output, configured to be driven through a cycle of phases consisting of a second precharge phase, followed by an second evaluate phase, and followed by a second isolate phase, solely in response to a second precharge control signal and a second evaluate control signal, wherein the second data output is isolated from a change in the second data input when the second precharge control signal and the second precharge control signal are de-asserted in the second isolate phase;

a second completion generator comprising an asymmetric C-element configured to receive the second precharge control signal, the second evaluate control signal, and the first delayed transition signal input as inputs, wherein the asymmetric C-element produces a second transition signal which is asserted when both the second evaluate control signal and the valid data input are asserted, and which is de-asserted when the second precharge control signal is asserted;

a second matched delay element comprising a plurality of inverters configured to receive the second transition signal as an input and to produce a second delayed transition signal as an output;

a second stage controller comprising an inverter configured to receive the second delayed transition signal from the second matched delay element as an input and to produce the second evaluate control signal as an output, an asymmetric C-element configured to receive the second delayed transition signal and a third transition signal from the environment as inputs and to produce an intermediate control signal which is de-asserted when the second delayed transition signal is de-asserted and which is asserted when the first delayed transition signal is asserted and the second transition signal is asserted, and a NAND-gate configured to receive the second delayed transition signal, the second transition signal and the intermediate control signal as inputs, and to produce the second precharge signal as an output.

20. A method for latchless dynamic asynchronous digital pipeline processing with a latchless dynamic asynchronous pipeline, the method comprising:

providing a first processing stage configured to be driven through a cycle of phases consisting of a first precharge phase, followed by an first evaluate phase, and followed by a first isolate phase, solely in response to a first precharge control signal and a first evaluate control signal;

providing a second processing stage configured to be driven through a cycle of phases consisting of a second precharge phase, followed by a second evaluate phase, followed by a second isolate phase, solely in response to a second precharge control signal and a second evaluate control signal, wherein the output of the second processing stage is isolated from changes in the input thereof when in the second isolate phase;

executing the first evaluate phase at the first processing stage;

executing the second evaluate phase at the second processing stage and providing a transition signal indicative of the phase of the second processing stage to the first stage controller;

providing the first precharge control signal and the first evaluate control signal to the first processing stage by the first stage controller in response to the transition signal; and executing the precharge phase, the first evaluate phase, and the first isolate phase of the first processing stage while the second processing stage remains in one of the second evaluate phase and the second isolate phase, such that first processing phase and the second processing phase may store two separate tokens without separation by a precharge phase.

* * * * *

UNITED STATES PATENT AND TRADEMARK OFFICE
CERTIFICATE OF CORRECTION

| | | |
|---|---|---|
| PATENT NO. | : 6,867,620 B2 | Page 1 of 1 |
| APPLICATION NO. | : 10/257896 | |
| DATED | : March 15, 2005 | |
| INVENTOR(S) | : Montek Singh et al. | |

It is certified that error appears in the above-identified patent and that said Letters Patent is hereby corrected as shown below:

Column 1, line 11, insert the following header and paragraph:

--Statement Regarding Federally Sponsored Research or Development
    This invention was made with government support under grant number CCR9734803 awarded by the National Science Foundation. The government has certain rights in the invention.--

Signed and Sealed this
Thirtieth Day of October, 2012

David J. Kappos
*Director of the United States Patent and Trademark Office*